(12) United States Patent
Ikematsu

(10) Patent No.: US 8,697,796 B2
(45) Date of Patent: Apr. 15, 2014

(54) SLIDABLE RESIN COMPOSITION AND MOLDED ARTICLE THEREOF

(75) Inventor: Ryusuke Ikematsu, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 212 days.

(21) Appl. No.: 12/451,630

(22) PCT Filed: May 20, 2008

(86) PCT No.: PCT/JP2008/059612
§ 371 (c)(1),
(2), (4) Date: Nov. 23, 2009

(87) PCT Pub. No.: WO2008/143356
PCT Pub. Date: Nov. 27, 2008

(65) Prior Publication Data
US 2010/0130656 A1 May 27, 2010

(30) Foreign Application Priority Data

May 24, 2007 (JP) ................. 2007-137677
Aug. 1, 2007 (JP) ................. 2007-200796
Aug. 1, 2007 (JP) ................. 2007-200797

(51) Int. Cl.
*C08L 69/00* (2006.01)
*C08L 51/00* (2006.01)

(52) U.S. Cl.
USPC ........... 524/537; 524/115; 524/147; 524/436; 525/474; 525/479

(58) Field of Classification Search
USPC ........... 524/537, 147, 115, 436; 525/479, 474
See application file for complete search history.

(56) References Cited

U.S. PATENT DOCUMENTS

| | | | | |
|---|---|---|---|---|
| 4,828,921 | A * | 5/1989 | Witman et al. | 428/412 |
| 4,939,206 | A * | 7/1990 | Wang | 525/63 |
| 6,433,050 | B1 | 8/2002 | Shinomiya et al. | |
| 2002/0151624 | A1 * | 10/2002 | Kobayashi | 524/115 |

FOREIGN PATENT DOCUMENTS

| | | |
|---|---|---|
| EP | 1 500 682 | 1/2005 |
| JP | 4-136065 | 5/1992 |
| JP | 5-209129 | 8/1993 |
| JP | 7-216240 | 8/1995 |
| JP | 9-302242 | 11/1997 |
| JP | 9-316282 | 12/1997 |
| JP | 10-182987 | 7/1998 |
| JP | 11-049961 | 2/1999 |
| JP | 11-217494 | 8/1999 |
| JP | 2000-264935 | 9/2000 |
| JP | 2000-302958 | 10/2000 |
| JP | 2002-080708 | 3/2002 |
| JP | 2003-089749 | 3/2003 |
| JP | 2005-320367 | 11/2005 |
| WO | 03/093365 | 11/2003 |
| WO | 2004/069914 | 8/2004 |
| WO | 2004/092236 | 10/2004 |
| WO | 2006/070664 | 7/2006 |

OTHER PUBLICATIONS

Machine translation of JP 5-209129.*
Machine translation of JP 05-209129, 1993.*
English translation of the International Preliminary Report on Patentability.
International Search Report issued Jul. 15, 2008 in International (PCT) Application No. PCT/JP2008/059612.
Japanese Office Action issued Feb. 26, 2013 in corresponding Japanese Application No. 2007-137677, with English translation.
Notification of Reasons for Refusal mailed Mar. 12, 2013 in corresponding Japanese Application No. 2007-200796.
Notification of Reasons for Refusal mailed Mar. 12, 2013 in corresponding Japanese Application No. 2007-200797.

* cited by examiner

*Primary Examiner* — Ling Choi
*Assistant Examiner* — Wenwen Cai
(74) *Attorney, Agent, or Firm* — Wenderoth, Lind & Ponack, L.L.P.

(57) ABSTRACT

A resin composition comprising 3.0 to 7.0 parts by weight of an acryl-modified polyorganosiloxane (component B) obtained by graft copolymerizing a specific polyorganosiloxane (component B1) with a (meth)acrylic ester based on 100 parts by weight of an aromatic polycarbonate resin (component A), and a molded article thereof. The resin composition is excellent in slidability, impact resistance, heat resistance and dimensional stability and has a good surface appearance.

11 Claims, No Drawings

SLIDABLE RESIN COMPOSITION AND MOLDED ARTICLE THEREOF

This application is a U.S. national stage of International Application No. PCT/JP2008/059612 filed May 20, 2008.

FIELD OF THE INVENTION

The present invention relates to a resin composition which contains a polycarbonate resin and has excellent slidability and to a molded article formed out of the same. More specifically, it relates to a resin composition which has the inherent properties of a polycarbonate resin, such as impact resistance, heat resistance and dimensional stability, and is excellent in slidability and surface appearance and to a molded article formed out of the same.

DESCRIPTION OF THE PRIOR ART

Since aromatic polycarbonate resins have many excellent characteristic properties, they are processed into various products by injection molding or the like to be used in a wide variety of industrial fields. Since the aromatic polycarbonate resins have excellent dimensional accuracy, mechanical strength and heat resistance, they are increasingly used in slide members such as gears in the fields of OA equipment and electric and electronic devices. However, when the polycarbonate resins are used alone, slidability is unsatisfactory. Therefore, various proposals have been made to improve the slidability of the polycarbonate resins.

For example, it is proposed to add a resin such as polytetrafluoroethylene, polyolefin, polyamide or polyester as a slidability improving agent to a polycarbonate resin (JP-A 4-136065). When a polytetrafluoroethylene resin is added as a slidability improving agent to a polycarbonate resin, moldability and impact strength may deteriorate. When a polyolefin, polyamide or polyester is added to a polycarbonate resin, satisfactory slidability cannot be obtained and the inherent characteristic properties of a polycarbonate resin, such as mechanical strength, heat resistance and flame retardancy are impaired.

It is also proposed to add a polyorganosiloxane to a polycarbonate resin (JP-A 10-182987, JP-A 9-316282). However, slidability and impact resistance cannot be obtained at the same time.

It is further proposed to add a polyorganosiloxane-based graft copolymer to a polycarbonate resin so as to provide flame retardancy (JP-A 2000-264935, WO2004/092236). Polyorganosiloxanes disclosed by these documents are unsatisfactory in terms of compatibility with the polycarbonate resin.

It is further proposed to add silicone oil and polyorganosiloxane to a polycarbonate resin (JP-A 2000-302958). However, the silicone oil has a defect that it readily causes glaze nonuniformity on the surface of a molded article due to its phase separation.

To provide releasability to a polycarbonate resin, it is proposed to add a polysiloxane-polyvinyl graft copolymer (JP-A 5-209129). However, slidability is unsatisfactory because the amount of the copolymer added is too small.

SUMMARY OF THE INVENTION

It is therefore an object of the present invention to provide a resin composition which has excellent slidability and retains the inherent characteristic properties of a polycarbonate resin, such as impact resistance, heat resistance and dimensional stability. It is another object of the present invention to provide a resin composition which has excellent slidability and hardly sees a defect in surface appearance such as glaze nonuniformity caused by a slidability improving agent. It is still another object of the present invention to provide a resin composition which has excellent slidability and flame retardancy. It is a further object of the present invention to provide a molded article of the resin composition.

The inventors of the present invention have conducted intensive studies to attain the above objects and have found that when a specific amount of an acryl-modified polyorganosiloxane having a specific structure is contained as a slidability improving agent (component B) in an aromatic polycarbonate resin, excellent slidability can be provided. They have also found that when a specific amount of a slidability improving agent (component B) is contained in an aromatic polycarbonate resin, glaze nonuniformity on the surface of a molded article is rare because phase separation between the slidability improving agent and the aromatic polycarbonate resin hardly occurs. They have also found that when an organic metal salt-based flame retardant (component C), an organic phosphorus compound-based flame retardant (component D) and a fluorine-containing dripping inhibitor (component E) are added to an aromatic polycarbonate resin in addition to the slidability improving agent, a resin composition having excellent flame retardancy is obtained. The present invention is predicated on these findings.

That is, the present invention is a resin composition which comprises 3.0 to 7.0 parts by weight of an acryl-modified polyorganosiloxane (component B) based on 100 parts by weight of an aromatic polycarbonate resin (component A), wherein the acryl-modified polyorganosiloxane (component B) is obtained by graft copolymerizing a polyorganosiloxane (component B1) represented by the following formula (1) with a mixture (component B2) of 70 to 100 wt % of a (meth)acrylic ester (component B2-1) and 0 to 30 wt % of another copolymerizable monomer (component B2-2) in a (component B2/component B1) weight ratio of 5/95 to 95/5 and a molded article of the resin composition.

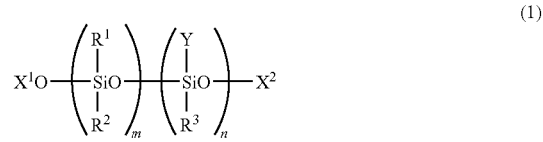

(1)

(in the above formula, $R^1$, $R^2$ and $R^3$ are each independently a hydrocarbon group having 1 to 20 carbon atoms or halogenated hydrocarbon group having 1 to 20 carbon atoms, Y is a radical reactive group selected from the group consisting of vinyl group, allyl group and γ-(meth)acryloxypropyl group, $X^1$ and $X^2$ are each independently a hydrogen atom, alkyl group having 1 to 4 carbon atoms or group represented by —$SiR^4R^5R^6$ ($R^4$ and $R^5$ are each independently a hydrocarbon group having 1 to 20 carbon atoms or halogenated hydrocarbon group having 1 to 20 carbon atoms, and $R^6$ is a hydrocarbon group having 1 to 20 carbon atoms, halogenated hydrocarbon group having 1 to 20 carbon atoms or radical reactive group selected from the group consisting of vinyl group, allyl group and γ-(meth)acryloxypropyl group), m is a positive integer of 10,000 or less, and n is an integer of 1 to 500.)

DETAILED DESCRIPTION OF THE PREFERRED EMBODIMENT

The present invention will be described in detail hereinunder.

(Component A: Aromatic Polycarbonate Resin)

The aromatic polycarbonate resin used as the component A in the present invention is obtained by reacting a diphenol with a carbonate precursor. Examples of the reaction include interface polymerization, melt transesterification, the solid-phase transesterification of a carbonate prepolymer and the ring-opening polymerization of a cyclic carbonate compound.

Typical examples of the diphenol used herein include hydroquinone, resorcinol, 4,4'-biphenol, 1,1-bis(4-hydroxyphenyl)ethane, 2,2-bis(4-hydroxyphenyl)propane (commonly called "bisphenol A", may be abbreviated as BPA hereinafter), 2,2'-bis(4-hydroxy-3-methylphenyl)propane, 2,2'-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl}pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Out of these, bis(4-hydroxyphenyl)alkanes are preferred, and bisphenol A is particularly preferred from the viewpoint of impact resistance and commonly used.

In the present invention, special polycarbonates manufactured by using other diphenols may be used as the component A, besides polycarbonates obtained from bisphenol A, which are general-purpose polycarbonates.

For example, polycarbonates (homopolymers or copolymers) obtained by using 4,4'-(m-phenylenediisopropylidene)diphenol (may be abbreviated as "BPM" hereinafter), 1,1-bis(4-hydroxyphenyl)cyclohexane, 1,1-bis(4-hydroxyphenyl)-3,3,5-trimethylcyclohexane (may be abbreviated as "Bis-TMC" hereinafter), 9,9-bis(4-hydroxyphenyl)fluorene and 9,9-bis(4-hydroxy-3-methylphenyl)fluorene (may be abbreviated as "BCF" hereinafter) as part or all of the diphenol component are suitable for use in fields in which the requirements for stability to dimensional change by water absorption and form stability are very strict. A diphenol other than BPA is used in an amount of preferably 5 mol % or more, particularly preferably 10 mol % or more of the whole diphenol component constituting the polycarbonate.

Particularly when high stiffness and excellent resistance to hydrolysis are required, the component A constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the diphenol component constituting the polycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol of the diphenol component constituting the polycarbonate.

(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the diphenol component constituting the polycarbonate.

These special polycarbonates may be used alone or in combination of two or more. They may be mixed with a commonly used bisphenol A type polycarbonate.

The production processes and characteristic properties of these special polycarbonates are detailed, for example, in JP-A 6-172508, JP-A 8-27370, JP-A 2001-55435 and JP-A 2002-117580.

Out of the above polycarbonates, polycarbonates whose water absorption coefficient and Tg (glass transition temperature) have been adjusted to the following ranges by controlling their compositions have high resistance to hydrolysis and rarely warp after molding. Therefore, they are particularly preferred in fields in which form stability is required.

(i) A polycarbonate having a water absorption coefficient of 0.05 to 0.15%, preferably 0.06 to 0.13% and a Tg of 120 to 180° C., or (ii) a polycarbonate having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of a polycarbonate is a value obtained by measuring the moisture content of a disk-like test specimen having a diameter of 45 mm and a thickness of 3.0 mm after the specimen is immersed in 23° C. water for 24 hours in accordance with ISO62-1980. Tg (glass transition temperature) is a value measured with a differential scanning calorimeter (DSC) in accordance with JIS K7121.

The carbonate precursor is a carbonyl halide, diester carbonate or haloformate, as exemplified by phosgene, diphenyl carbonate and dihaloformates of a diphenol.

For the manufacture of the aromatic polycarbonate resin from a diphenol and a carbonate precursor by interfacial polymerization, a catalyst, a terminal capping agent and an antioxidant for preventing the oxidation of the diphenol may be optionally used. Examples of the aromatic polycarbonate resin include a branched polycarbonate resin obtained by copolymerizing a polyfunctional aromatic compound having 3 or more functional groups, a polyester carbonate resin obtained by copolymerizing an aromatic or aliphatic (including alicyclic) bifunctional carboxylic acid, a copolycarbonate resin obtained by copolymerizing a bifunctional alcohol (including an alicyclic bifunctional alcohol) and a polyester carbonate resin obtained by copolymerizing the bifunctional carboxylic acid and the bifunctional alcohol. It may be a mixture of two or more of the obtained aromatic polycarbonate resins.

Since the branched polycarbonate resin can further improve dripping preventing capability synergistically, its use is preferred. Examples of the polyfunctional aromatic compound having 3 or more functional groups used in the branched polycarbonate resin include phloroglucin, phloroglucide, trisphenols such as 4,6-dimethyl-2,4,6-tris(4-hydroxydiphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of the polyfunctional aromatic compound contained in the branched polycarbonate is 0.001 to 1 mol %, preferably 0.005 to 0.9 mol %, more preferably 0.01 to 0.8 mol %, particularly preferably 0.05 to 0.4 mol % based on the whole amount of the aromatic polycarbonate resin. Particularly in the case of melt transesterification, a branched structure may be produced by a side reaction. The amount of this branched structure is preferably in the above range based on the whole amount of the aromatic polycarbonate resin. The amount of the branched structure can be calculated by $^1$H-NMR measurement.

The aliphatic bifunctional carboxylic acid is preferably α, ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol.

A polycarbonate-polyorganosiloxane copolymer obtained by copolymerizing a polyorganosiloxane unit may also be used.

The reactions for manufacturing the polycarbonate resin such as interfacial polymerization, melt transesterification, the solid-phase transesterification of a carbonate prepolymer and the ring-opening polymerization of acyclic carbonate compound are well known through various documents and patent gazettes. Details of other reactions are also well known through written documents and patent gazettes.

For the manufacture of the resin composition of the present invention, the viscosity average molecular weight (M) of the aromatic polycarbonate resin is not particularly limited but preferably $1 \times 10^4$ to $5 \times 10^4$, more preferably $1.4 \times 10^4$ to $3 \times 10^4$, much more preferably $1.4 \times 10^4$ to $2.4 \times 10^4$.

An aromatic polycarbonate resin having a viscosity average molecular weight of less than $1 \times 10^4$ may not obtain impact resistance which is expected for practical use and satisfactory dripping preventing capability. Therefore, it is apt to be inferior in flame retardancy. Meanwhile, a resin composition obtained from an aromatic polycarbonate resin having a viscosity average molecular weight of more than $5 \times 10^4$ is inferior in general applicability due to its low fluidity at the time of injection molding. Full use of the feature of the present invention may not be made due to the high molding temperature of the resin composition.

The aromatic polycarbonate resin may be obtained by mixing an aromatic polycarbonate resin having a viscosity average molecular weight outside the above range. A polycarbonate resin having a viscosity average molecular weight higher than the above range ($5 \times 10^4$) can further improve dripping preventing capability synergistically due to the enhanced entropy elasticity of the resin. This improving effect is larger than that of the above branched polycarbonate. As a more preferred embodiment, an aromatic polycarbonate resin (component A3) (to be referred to as "high-molecular weight component-containing aromatic polycarbonate resin" hereinafter) having a viscosity average molecular weight of $1.6 \times 10^4$ to $3.5 \times 10^4$ and composed of an aromatic polycarbonate resin having a viscosity average molecular weight of $7 \times 10^4$ to $3 \times 10^5$ (component A-3-1) and an aromatic polycarbonate resin having a viscosity average molecular weight of $1 \times 10^4$ to $3 \times 10^4$ (component A-3-2) may be used as the component A.

In this high-molecular weight component-containing aromatic polycarbonate resin (component A3), the molecular weight of the component A-3-1 is preferably $7 \times 10^4$ to $2 \times 10^5$, more preferably $8 \times 10^4$ to $2 \times 10^5$, much more preferably $1 \times 10^5$ to $2 \times 10^5$, particularly preferably $1 \times 10^5$ to $1.6 \times 10^5$. The molecular weight of the component A-3-2 is preferably $1 \times 10^4$ to $2.5 \times 10^4$, more preferably $1.1 \times 10^4$ to $2.4 \times 10^4$, much more preferably $1.2 \times 10^4$ to $2.4 \times 10^4$, particularly preferably $1.2 \times 10^4$ to $2.3 \times 10^4$.

The high-molecular weight component-containing aromatic polycarbonate resin (component A-3) can be obtained by mixing together the above components A-3-1 and A-3-2 in a ratio which ensures that a predetermined molecular weight range is satisfied. Preferably, the content of the component A-3-1 is preferably 2 to 40 wt %, more preferably 3 to 30 wt %, much more preferably 4 to 20 wt %, particularly preferably 5 to 20 wt % based on 100 wt %, of the component A3.

Methods for preparing the component A3 include (1) one in which the components A-3-1 and A-3-2 are polymerized independently and mixed together, (2) one in which an aromatic polycarbonate resin showing a plurality of polymer peaks in its molecular weight distribution chart obtained by the GPC method as typified by the method disclosed by JP-A 5-306336 is manufactured in the same system to ensure that the condition of the component A-1 of the present invention is satisfied, and (3) one in which the aromatic polycarbonate resin manufactured by the above manufacturing method (2) and the component A-3-1 and/or the component A-3-2 manufactured separately are mixed together.

The viscosity average molecular weight M in the present invention is calculated based on the following equation from the specific viscosity (ηsp) of a solution prepared by dissolving 0.7 g of an aromatic polycarbonate in 100 ml of methylene chloride at 20° C. which is obtained with an Ostwald viscometer based on the following equation.

$$\text{Specific viscosity } (\eta_{sp}) = (t - t_0)/t_0$$

[$t_0$ is a time (seconds) required for the dropping of methylene chloride and t is a time (seconds) required for the dropping of a sample solution]

$$\eta_{sp}/c = [\eta] + 0.45 \times [\eta]^2 c \text{ ([\eta] represents an intrinsic viscosity)}$$

$$[\eta] = 1.23 \times 10^{-4} M^{0.83}$$

$$c = 0.7$$

The method of calculating the above viscosity average molecular weight is applied to the measurement of the viscosity average molecular weight of the resin composition of the present invention and the viscosity average molecular weight of a molded article formed out of the resin composition. That is, the viscosity average molecular weights in the present invention are obtained by inserting the specific viscosity ($\eta_{sp}$) of a solution prepared by dissolving 0.7 g of the molded article in 100 ml of methylene chloride at 20° C. into the above equation.

(Component B: Acryl-Modified Polyorganosiloxane)

The component B in the present invention is an acryl-modified polyorganosiloxane obtained by graft copolymerizing a polyorganosiloxane (component B1) represented by the following formula (1) with a mixture (component B2) of 70 to 100 wt % of a (meth)acrylic ester (component B2-1) and 0 to 30 wt % of another copolymerizable monomer (component B2-2) in a (component B2/component B1) weight ratio of 5/95 to 95/5.

(Component B1: Polyorganosiloxane)

The polyorganosiloxane (component B1) is represented by the following formula (1).

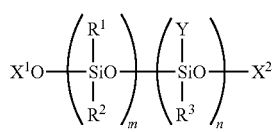
(1)

In the above formula, $R^1$, $R^2$ and $R^3$ are each independently (i) a hydrocarbon group having 1 to 20 carbon atoms or (ii) a halogenated hydrocarbon group having 1 to 20 carbon atoms.

Examples of the hydrocarbon group having 1 to 20 carbon atoms (i) include alkyl groups having 1 to 20 carbon atoms and aryl groups having 5 to 20 carbon atoms. The alkyl groups include methyl group, ethyl group, propyl group and butyl group. The aryl groups include phenyl group, tolyl group, xylyl group and naphthyl group. The halogenated hydrocarbon group having 1 to 20 carbon atoms (ii) is a group obtained by substituting at least one hydrogen atom bonded to the carbon atom of the hydrocarbon group having 1 to 20 carbon atoms (i) by a halogen atom. Examples of the substituting halogen atom include fluorine atom, chlorine atom and bromine atom.

Y is a radical reactive group selected from the group consisting of vinyl group, allyl group (2-propenyl group) and γ-methacryloxypropyl group.

$X^1$ and $X^2$ are each independently a hydrogen atom, alkyl group having 1 to 4 carbon atoms or group represented by —$SiR^4R^5R^6$. Examples of the alkyl group having 1 to 4 carbon atoms include methyl group, ethyl group, propyl group and butyl group. $R^4$ and $R^5$ in the group represented by —$SiR^4R^5R^6$ are each independently (i) a hydrocarbon group having 1 to 20 carbon atoms or (ii) a halogenated hydrocarbon group having 1 to 20 carbon atoms. Examples of these groups are the same as those listed for $R^1$ to $R^3$. $R^6$ is (i) a hydrocarbon group having 1 to 20 carbon atoms, (ii) a halogenated hydrocarbon group having 1 to 20 carbon atoms, or (iii) a radical reactive group selected from the group consisting of vinyl group, allyl group and γ-(meth)acryloxypropyl group. Examples of the hydrocarbon group having 1 to 20 carbon atoms (i) and the halogenated hydrocarbon group having 1 to 20 carbon atoms (ii) are the same as those listed for $R^1$ to $R^3$.

m is a positive integer of 10,000 or less. n is an integer of 1 to 500. $R^1$ to $R^6$ and Y may be the same or different in one molecule.

The above polyorganosiloxane may be manufactured by known methods. For example, it may be manufactured by using a chain or cyclic low-molecular weight polyorganosiloxane having the above groups and an alkoxysilane by combining hydrolysis means, polymerization means and equilibrating means. Hydrolysis means, polymerization and equilibrating may be carried out in a water dispersion state with known technology.

(Component B2-1: (meth)acrylic ester)

The (meth)acrylic ester (component B2-1) is an alkyl ester, hydroxyalkyl ester or alkoxyalkyl ester of acrylic acid or methacrylic acid. Specific examples of the (meth)acrylic ester include acrylic esters such as methyl acrylate, ethyl acrylate, isopropyl acrylate, n-propyl acrylate, n-butyl acrylate, isobutyl acrylate, 2-ethylhexyl acrylate, isooctyl acrylate, n-octyl acrylate, 2-hydroxyethyl acrylate and 2-methoxyethyl acrylate.

Examples of the (meth)acrylic ester also include methacrylic esters such as methyl methacrylate, ethyl methacrylate, isopropyl methacrylate, n-propyl methacrylate, n-butyl methacrylate, isobutyl methacrylate, n-hexyl methacrylate, 2-ethylhexyl methacrylate, n-lauryl methacrylate, n-hydroxyethyl methacrylate and 2-ethoxyethyl methacrylate. They may be used alone or in combination of two or more. Methyl methacrylate and/or 2-hydroxyethyl methacrylate are particularly preferred.

The content of the (meth)acrylic ester (component B2-1) in the mixture (component B2) is 70 to 100 wt %, preferably 72 to 100 wt %, more preferably 74 to 100 wt % based on 100 wt % of the total of it and the another monomer (component B2-2).

(Component B2-2: Another Copolymerizable Monomer)

Examples of the another monomer (component B2-2) copolymerizable with the (meth)acrylic ester include monomers having one double bond such as styrene-based compounds including styrene, vinyl toluene and α-methylstyrene, unsaturated nitriles including acrylonitrile and methacrylonitrile, halogenated olefins including vinyl chloride and vinylidene chloride, vinyl esters including vinyl acetate and vinyl propionate, unsaturated amides including acrylamide, methacrylamide and N-methylolacrylamide, and unsaturated carboxylic acids including acrylic acid, methacrylic acid and maleic anhydride. Polyunsaturated monomers such as ethylene glycol dimethacrylate, propylene glycol dimethacrylate, 1,4-butanediol dimethacrylate, allyl methacrylate, triallyl cyanurate and triallyl isocyanurate are also included as typical examples of the monomer. They may be used in combination of two or more.

The content of the another monomer (component B2-2) in the mixture (component B2) is 0 to 30 wt %, preferably 0 to 28 wt %, more preferably 0 to 26 wt % based on 100 wt % of the total of the another monomer and the (meth)acrylic ester (component B2-1).

(Graft Copolymerization)

The graft copolymerization may be carried out by known methods. For example, a polyorganosiloxane and a mixture of a (meth)acrylic ester and another monomer are emulsified and dispersed in water to be polymerized in the presence of a radical polymerization initiator for graft copolymerization. Known emulsifiers and radical polymerization initiators which are used for emulsion polymerization may be used as the emulsifier and the radical polymerization initiator in this method. After the end of polymerization, a graft copolymer can be obtained by salting-out, filtration, rinsing and drying. In this emulsion graft copolymerization, when the polyorganosiloxane is manufactured while it is dispersed in water as described above, the obtained emulsion of the polyorganosiloxane may be used as a stock material for graft copolymerization.

The acryl-modified polyorganosiloxane (component B) is obtained by graft copolymerizing a polyorganosiloxane (component B1) with a mixture of a (meth)acrylic ester and another copolymerizable monomer (component B2) in a (component B2/component B1) weight ratio of 5/95 to 95/5, preferably 10/90 to 80/20, more preferably 15/85 to 70/30, particularly preferably 20/80 to 60/40. When the weight ratio of the mixture of the (meth)acrylic ester and the another copolymerizable monomer is less than 5, the obtained acryl-modified polyorganosiloxane becomes unsatisfactory in terms of compatibility with the polycarbonate and is inferior in mechanical strength and the appearance of a molded article and when the weight ratio is more than 95, the obtained acryl-modified polyorganosiloxane becomes unsatisfactory in terms of slidability.

The above acryl-modified polyorganosiloxane (component B) is available, for example, from Nisshin Kagaku Co., Ltd. under the trade name of Sharine and can be easily acquired from the market.

The content of the acryl-modified polyorganosiloxane (component B) in the resin composition of the present invention is 3.0 to 7.0 parts by weight, preferably 3.2 to 6.8 parts by weight, more preferably 3.4 to 6.6 parts by weight based on 100 parts by weight of the polycarbonate resin (component A). When the content of the acryl-modified polyorganosiloxane (component B) is lower than 3.0 parts by weight, the effect of improving slidability becomes unsatisfactory and when the content is higher than 7.0 parts by weight, the appearance is worsened by excessive transfer to the surface and the mechanical properties are deteriorated disadvantageously.

(Component C: Organic Metal Salt-Based Flame Retardant)

The resin composition preferably contains 0.005 to 0.6 part by weight of an organic metal salt-based flame retardant (component C) based on 100 parts by weight of the aromatic polycarbonate resin (component A). The organic metal salt-based flame retardant (component C) is preferably an alkali (earth) metal salt of an organic acid, more preferably an alkali (earth) metal salt of an organic sulfonic acid. The number of carbon atoms of the alkali (earth) metal salt of an organic acid is preferably 1 to 50, more preferably 1 to 40.

Examples of the alkali (earth) metal salt of an organic sulfonic acid include metal salts of a fluorine-substituted alkyl sulfonic acid such as alkali metal or alkali earth metal salts of a perfluoroalkylsulfonic acid. The number of carbon atoms of the perfluoroalkylsulfonic acid is preferably 1 to 10, more preferably 2 to 8.

Examples of the alkali (earth) metal salt of an organic sulfonic acid include alkali metal or alkali earth metal salts of an aromatic sulfonic acid. The number of carbon atoms of the aromatic sulfonic acid is preferably 7 to 50, more preferably 7 to 40.

The metal constituting the organic metal salt is preferably an alkali metal or alkali earth metal. Examples of the alkali metal include lithium, sodium, potassium, rubidium and cesium. Examples of the alkali earth metal include beryllium, magnesium, calcium, strontium and barium. Alkali metals are more preferred. Therefore, the preferred component C in the present invention is an alkali metal salt of a perfluoroalkylsulfonic acid. Out of the above alkali metals, when the requirement for transparency is high, rubidium and cesium are preferred but they may be disadvantageous in terms of cost because they cannot be used for general purpose and are hardly refined. On the other hand, lithium and sodium which are advantageous in terms of cost and flame retardancy may be disadvantageous in terms of transparency. In consideration of these, an alkali metal contained in the alkali metal salt of a perfluoroalkylsulfonic acid may be selected. Potassium salts of a perfluoroalkylsulfonic acid which are excellent in balance among these characteristic properties are most preferred. The potassium salts may be used in combination with another alkali metal salt of a perfluoroalkylsulfonic acid.

Preferred examples of the alkali metal salt of a perfluoroalkylsulfonic acid include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. Out of these, potassium perfluorobutanesulfonate is particularly preferred.

The component C can be manufactured by a known method in which the amount of a fluoride ion contained in raw materials is reduced in the manufacture of a fluorine-containing organic metal salt, a known method in which hydrogen fluoride obtained by a reaction is removed by a gas generated at the time of the reaction or heating, or a known method in which the amount of a fluoride ion is reduced by purification such as recrystallization or re-sedimentation in the manufacture of a fluorine-containing organic metal salt. Since the component C is relatively soluble in water, it is preferably manufactured by using ion exchange water, especially water having an electric resistance of 18 MΩ·cm or more, that is, an electric conductivity of about 0.55 μS/cm or less to dissolve it at a temperature higher than normal temperature and rinse it and then cooling it for recrystallization.

The manufacture of the alkali metal salt of a perfluoroalkylsulfonic acid as the preferred component C in the present invention is generally carried out by neutralizing a perfluoroalkylsulfonic acid or a perfluoroalkylsulfonyl fluoride with a basic compound such as a carbonate or hydroxide of an alkali metal. When the perfluoroalkylsulfonic acid is used, as it is often liquid and it is difficult to refine it, a relatively large amount of a fluoride ion which gets mixed in during the manufacture of the sulfonic acid is contained. When the perfluoroalkylsulfonyl fluoride is used, a fluoride ion is formed by its neutralization reaction.

When the perfluoroalkylsulfonic acid is used, it is possible to reduce the amount of the fluoride ion by carrying out a neutralization reaction disclosed by JP-A 1-268671 at a pH of 3 or less which is an acid range. An alkali metal salt of a perfluoroalkylsulfonic acid which has a reduced content of the fluoride ion is obtained without carrying out a refining step in the above method. When the perfluoroalkylsulfonyl fluoride is used as a raw material, it is preferred to reduce the amount of the fluoride ion to a predetermined value by re-crystallization after the manufacture of the metal salt. Even when the perfluoroalkylsulfonic acid is used as a raw material, a re-crystallization refining step is preferably included. Stated more specifically, an alkali metal salt of a perfluoroalkylsulfonic acid manufactured by neutralizing a perfluoroalkylsulfonic acid with a carbonate or hydroxide of an alkali metal or neutralizing perfluoroalkylsulfonyl fluoride with a carbonate or hydroxide of an alkali metal (preferably the latter method) is dissolved in 2 to 10 times more ion exchange water than the weight of the metal salt (particularly preferably an electric resistance of 18 MΩ·cm or more) at 40 to 90° C. (preferably 60 to 85° C.), stirred for 0.1 to 3 hours, preferably 0.5 to 2.5 hours, and then cooled to 0 to 40° C., preferably 10 to 35° C., and the precipitated crystal is taken out by filtration to manufacture an alkali metal salt of a perfluoroalkylsulfonic acid as the preferred component C of the present invention.

The content of the organic metal salt-based flame retardant (component C) in the resin composition of the present invention is 0.005 to 0.6 part by weight, preferably 0.005 to 0.2 part by weight, more preferably 0.008 to 0.13 part by weight based on 100 parts by weight of the aromatic polycarbonate resin (component A). Within the above preferred range, flame retardancy is high.

(Component D: Organic Phosphorus Compound-Based Flame Retardant)

The resin composition of the present invention preferably contains 4.0 to 9.0 parts by weight of an organic phosphorus compound-based flame retardant (component D) based on 100 parts by weight of the aromatic polycarbonate resin (component A).

Examples of the organic phosphorus compound-based flame retardant (component D) include red phosphorus and organic phosphate-based flame retardants. Out of these, organic phosphate-based flame retardants are preferred, and one or more phosphates represented by the following formula (2) are particularly preferred.

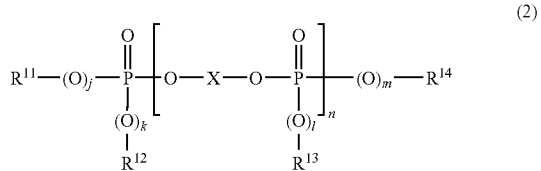

In the above formula, X is a diphenol residue derived from a dihydroxy compound selected from the group consisting of hydroquinone, resorcinol, bis(4-hydroxydiphenyl)methane, bisphenol A, dihydroxydiphenyl, dihydroxynaphthalene, bis (4-hydroxyphenyl)sulfone, bis(4-hydroxyphenyl)ketone and bis(4-hydroxyphenyl)sulfide.

J, k, l and m are each independently 0 or 1, and n is an integer of 0 to 5 (n is an average value in the case of a mixture of phosphates having different degrees n of polymerization).

$R^{11}$, $R^{12}$, $R^{13}$, and $R^{14}$ are each independently a monophenol residue derived from an aryl group selected from the group consisting of phenol, cresol, xylenol, isopropylphenol, butylphenol and p-cumylphenol which may be substituted by a halogen atom.

X in the formula (2) is preferably a diphenol residue derived from a dihydroxy compound selected from the group consisting of hydroquinone, resorcinol and bisphenol A. j, k, l and m are each preferably 1, and n is preferably an integer of 0 to 3 (n is an average value in the case of a mixture of phosphates having different degrees n of polymerization). $R^{11}$, $R^{12}$, $R^{13}$ and $R^{14}$ are preferably each independently a monophenol residue derived from an aryl group selected from the group consisting of phenol, cresol and xylenol which may be substituted by at least one halogen atom.

Particularly preferably, X is a diphenol residue derived from resorcinol, j, k, l and m are each 1, n is 0 or 1, and $R^{11}$, $R^{12}$, $R^{13}$ and $R^{14}$ are each independently a monophenol residue derived from phenol or xylenol.

Out of the organic phosphates, triphenyl phosphate as a phosphate compound and resorcinol bis(dixylenylphosphate) and bisphenol A bis(diphenylphosphate) as phosphate oligomers are preferably used as they have excellent resistance to hydrolysis. Resorcinol bis(dixylenylphosphate) and bisphenol A bis(diphenylphosphate) are more preferred from the viewpoint of heat resistance.

The content of the organic phosphorus compound-based flame retardant in the resin composition of the present invention is 4.0 to 9.0 parts by weight, preferably 4.8 to 8.4 parts by weight, more preferably 5.2 to 8.0 parts by weight based on 100 parts by weight of the component A. A resin composition having excellent flame retardancy is provided due to the above preferred composition. When the content of the organic phosphorus compound-based flame retardant falls below the above range, it is difficult to obtain a flame retarding effect and when the content exceeds the above range, a reduction in critical PV value may be caused by the deterioration of the physical properties and heat resistance of the composition.
(Component E: Fluorine-Containing Dripping Inhibitor)

The resin composition of the present invention preferably contains a fluorine-containing dripping inhibitor (component E) in an amount of 0.01 to 1 part by weight based on 100 parts by weight of the aromatic polycarbonate resin (component A). An example of the fluorine-containing dripping inhibitor (component E) is polytetrafluoroethylene having fibril forming capability.

The polytetrafluoroethylene (PTFE) having fibril forming capability has an extremely high molecular weight and tends to be bonded to other PTFE' s by an external function such as shear force to become fibrous. The molecular weight of PTFE is 1,000,000 to 10,000,000, more preferably 2,000,000 to 9,000,000 in terms of number average molecular weight obtained from standard specific gravity. The PTFE may be used in the form of an aqueous dispersion besides a solid form. A mixture of the PTFE having fibril forming capability and another resin may be used to improve the dispersibility in a resin of the PTFE and obtain higher flame retardancy and mechanical properties. Commercially available products of the PTFE having fibril forming capability include the Teflon (registered trademark) 6J of Mitsui DuPont Fluorochemical Co., Ltd. and the Polyfuron MPA FA500 and F-201L of Daikin Industries, Ltd. Typical commercially available products of the PTFE aqueous dispersion include the Fluon AD-1 and AD-936 of Asahi ICI Fluoropolymers Co., Ltd., the Fluon D-1 and D-2 of Daikin Industries, Ltd., and the Teflon (registered trademark) 30J of Mitsui DuPont Fluorochemical Co., Ltd.

A PTFE mixture obtained by (1) a method in which a PTFE aqueous dispersion and an aqueous dispersion or solution of an organic polymer are mixed together and co-precipitation is carried out to obtain a coagulated mixture (method disclosed by JP-A 60-258263 and JP-A 63-154744), (2) a method in which a PTFE aqueous solution and a dried organic polymer particle are mixed together (method disclosed by JP-A 4-272957), (3) a method in which a PTFE aqueous dispersion and an organic polymer particle solution are uniformly mixed together and the mediums are removed from the resulting mixture at the same time (method disclosed by JP-A 06-220210 and JP-A 08-188653), (4) a method in which a monomer for forming an organic polymer is polymerized in a PTFE aqueous dispersion (method disclosed by JP-A 9-95583) or (5) a method in which a PTFE aqueous dispersion and an organic polymer dispersion are uniformly mixed together, a vinyl-based monomer is polymerized in the dispersion mixture, and then a mixture is obtained (method disclosed by JP-A 11-29679) may be used. Commercially available products of the PTFE mixture include the Metabrene A3000 (trade name) of Mitsubishi Rayon Co., Ltd. and the BLENDEX B449 (trade name) of GE Specialty Chemicals Co., Ltd.

The content of PTFE in the mixture is preferably 1 to 60 wt %, more preferably 5 to 55 wt % based on 100 wt % of the PTFE mixture. When the content of PTFE falls within the above range, the excellent dispersibility of PTFE can be attained.

The content of the fluorine-containing dripping inhibitor (component E) in the resin composition of the present invention is 0.01 to 1 part by weight, preferably 0.03 to 0.8 part by weight, more preferably 0.05 to 0.6 part by weight based on 100 parts by weight of the component A. When the content of the component E is lower than 0.01 part by weight, a flame retarding effect is hardly obtained and when the content is higher than 1 part by weight, the appearance of a molded article worsens disadvantageously.

The resin composition of the present invention preferably contains 4.0 to 9.0 parts by weight of an organic phosphorus compound-based flame retardant (component D) and 0.01 to 1 part by weight of a fluorine-containing dripping inhibitor (component E) based on 100 parts by weight of the aromatic polycarbonate resin (component A).

(Phosphorus-Based Stabilizer)

The resin composition of the present invention preferably further contains a phosphorus-based stabilizer. The phosphorus-based stabilizer improves thermal stability, mechanical properties, color and molding stability at the time of manufacture or molding. Since ultraviolet deterioration is accompanied by oxidation deterioration to no small extent, the phosphorus-based stabilizer provides an auxiliary effect in the suppression of the oxidation deterioration. The phosphorus-based stabilizer is, for example, a phosphorous acid, phosphoric acid, phosphonous acid, phosphonic acid or ester thereof.

Specific examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a diphenol and have a cyclic structure may also be used. The phosphite compounds include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl)phosphite and 2,2'-ethylidenebis(4-methyl-6-tert-butylphenyl) (2-tert-butyl-4-methylphenyl)phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite.

Out of these, tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be used and is preferably used in combination with the above phosphite compound having aryl groups substituted for two or more of the alkyl groups.

Examples of the phosphonate compound include dimethyl benzenephosphonate, diethyl benzenephosphonate and dipropyl benzenephosphonate.

The above phosphorus-based stabilizers may be used alone or in combination of two or more. Out of the above phosphorus-based stabilizers, phosphite compounds and phosphonite compounds are preferred. Tris(2,4-di-tert-butylphenyl)phosphite, tetrakis(2,4-di-tert-butylphenyl)-4,4'-biphenylene diphosphonite and bis(2,4-di-tert-butylphenyl)-phenyl-phenyl phosphonite are particularly preferred. It is also preferred to use these compounds in combination with a phosphate compound.

(Hindered Phenol-Based Stabilizer)

The resin composition of the present invention may further contain a hindered phenol-based stabilizer. When the hindered phenol-based stabilizer is contained, the dry-heat deterioration of the resin composition can be prevented. Since ultraviolet deterioration is accompanied by oxidation deterioration to no small extent, the hindered phenol-based stabilizer is also effective in the suppression of the oxidation deterioration. Examples of the hindered phenol-based stabilizer include α-tocopherol, butylhydroxytoluene, cinapyl alcohol, vitamin E, n-octadecyl-β-(4'-hydroxy-3',5'-di-tert-butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-tert-butyl-4-hydroxy-5-methylphenyl)propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)iso cyanurate, 1,3,5-tris-2[3(3,5-di-tert-butyl-4-hydroxyphenyl)propionyloxy]ethyl isocyanurate and tetrakis[methylene-3-(3',5'-di-tert-butyl-4-hydroxyphenyl))propionate]methane. All of them are easily acquired. The above hindered phenol-based antioxidants may be used alone or in combination of two or more.

The content of at least one stabilizer selected from the phosphorus-based stabilizers and the hindered phenol-based stabilizers is preferably 0.001 to 1 part by weight, more preferably 0.003 to 0.5 part by weight, much more preferably 0.005 to 0.1 part by weight based on 100 parts by weight of the aromatic polycarbonate resin (component A). When the content of the stabilizer falls below the above range, it is difficult to obtain a satisfactory stabilizing effect and when the content exceeds the above range, the deterioration of the physical properties and flame retardancy of the composition may occur.

(Reinforcing Filler)

Known fillers may be mixed with the resin composition of the present invention as a reinforcing filler. Examples of the filler include talc, wollastonite, mica, clay, montmorillonite, smectite, kaolin, calcium carbonate, glass fibers, glass beads, glass balloons, glass milled fibers, glass flakes, carbon fibers, carbon flakes, carbon beads, carbon milled fibers, metal flakes, metal fibers, metal coated glass fibers, metal coated carbon fibers, metal coated glass flakes, silica, ceramic particles, ceramic fibers, ceramic balloons, graphite, aramid fibers and whiskers (such as potassium titanate whiskers, aluminum borate whiskers and basic magnesium sulfate). These reinforcing fillers may be used alone or in combination of two or more. The content of the filler is preferably 1 to 50 parts by weight based on 100 parts by weight of the component A.

(Light Reflection White Pigment)

The resin composition of the present invention may contain a white pigment. A titanium dioxide (especially titanium dioxide treated with an organic surface treatment agent such as silicone) pigment is particularly preferred as the white pigment. The content of the white pigment is preferably 1 to 30 parts by weight, more preferably 2 to 20 parts by weight based on 100 parts by weight of the component A.

(Radical Generator)

The resin composition of the present invention may contain a radical generator. Preferred examples of the radical generator include organic peroxides such as 2,5-dimethyl-2,5-di(t-butylperoxy)hexyne-3 and dicumyl peroxide, and 2,3-dimethyl-2,3-diphenylbutane(dicumyl). These are commercially available under the trade names of Perhexyne 25, Percumyl D and Nofiner BC from NOF Corporation and easily acquired. Since a radical generator which generates an extremely small amount of a radical at the time of melt kneading but generates a radical having a certain degree of stability effectively at the time of combustion is preferred, 2,3-dimethyl-2,3-diphenylbutane(dicumyl) is a more preferred radical generator. When flame retardancy is required, the flame retardancy of the resin composition can be further improved by the radical generator. The content of the radical generator is preferably 0.001 to 0.3 part by weight, more preferably 0.01 to 0.1 part by weight based on 100 parts by weight of the component A.

(Optical Stabilizer)

The resin composition of the present invention may also contain a hindered amine-based optical stabilizer typified by bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butanetetracarboxylate, tetrakis (1,2,2,6,6-pentamethyl-4-piperidyl)-1,2,3,4-butanetetracarboxylate, poly{[6-(1,1,3,3-tetramethylbutyl) amino-1,3,5-triazin-2, 4-diyl][(2,2,6,6-tetramethylpiperidyl) imino]hexamethylene[(2,2,6,6-tetramethylpiperidyl) imino]} and polymethylpropyl-3-oxy-[4-(2,2,6,6-tetramethyl)piperidinyl]siloxane.

These optical stabilizers may be used alone or in combination of two or more. The content of the optical stabilizer is preferably 0.0005 to 3 parts by weight, more preferably 0.01 to 2 parts by weight, much more preferably 0.02 to 1 part by weight based on 100 parts by weight of the aromatic polycarbonate (component A).

(Another Resin and Elastomer)

The resin composition of the present invention may contain small amounts of another resin and an elastomer within limits not prejudicial to the object of the present invention.

Examples of the another resin include polyester resins such as polyethylene terephthalate and polybutylene terephthalate, polyamide resins, polyimide resins, polyether imide resins, polyurethane resins, silicone resins, polyphenylene ether resins, polyphenylene sulfide resins, polysulfone resins, polyolefin resins such as polyethylene and polypropylene, polystyrene resins, acrylonitrile/styrene copolymer (AS resin), acrylonitrile/butadiene/styrene copolymer (ABS resin), polymethacrylate resins, phenolic resins and epoxy resins.

Examples of the elastomer include isobutylene/isoprene rubber, styrene/butadiene rubber, ethylene/propylene rubber, acrylic elastomers, polyester-based elastomers, polyamide-based elastomers, core-shell type elastomers such as MBS (methyl methacrylate/styrene/butadiene) rubber and MAS (methyl methacrylate/acrylonitrile/styrene) rubber.

The resin composition of the present invention may contain small amounts of additives known per se to provide various functions to a molded article and improve its characteristic properties. These additives are used in normal amounts within limits not prejudicial to the object of the present invention.

The additives include a colorant (pigment or dye such as carbon black or titanium oxide), inorganic phosphor (such as a phosphor comprising an aluminate as a mother crystal), antistatic agent, fluidity modifier, crystal nucleating agent, inorganic or organic antifungus agent, optical catalyst-based anti-fouling agent (such as particulate titanium oxide or particulate zinc oxide), impact modifier typified by graft rubber, infrared absorber (heat ray absorber) and photochromic agent.

(Manufacture of Resin Composition)

The resin composition of the present invention can be manufactured by mixing together the components A and B and other components such as components C, D and E fully by using pre-mixing means such as a twin-cylinder mixer, Henschel mixer, mechanochemical device or extrusion mixer, optionally granulating the resulting mixture by means of an extrusion granulator or briquetting machine, melt kneading the mixture by means of a melt kneader typified by a vented double-screw extruder and then pelletizing the kneaded product by means of a device such as a pelletizer.

To supply the above components into the melt kneader, (i) a method in which the components A and B and other components are supplied into the melt kneader independently and (ii) a method in which the components A and B and some of other components are pre-mixed together and supplied into the melt kneader independently of the other components may be employed.

An extruder having a vent from which water contained in the raw material and a volatile gas generated from the molten kneaded resin can be removed may be preferably used. A vacuum pump is preferably installed to discharge the generated water and volatile gas to the outside of the extruder from the vent efficiently. A screen for removing foreign matter contained in the extruded raw material may be installed in a zone before the dice of the extruder to remove the foreign matter from the resin composition. Examples of the screen include a metal net, screen changer and sintered metal plate (such as a disk filter). Examples of the melt kneader include a Banbury mixer, kneading roll, single-screw extruder and multi-screw extruder having 3 or more screws, besides the double-screw extruder.

The resin extruded from the extruder is pelletized by directly cutting it or by forming it into a strand and cutting the strand with a pelletizer. When the influence of external dust must be reduced at the time of pelletization, the atmosphere surrounding the extruder is preferably cleaned. The shape of the obtained pellet may be columnar, rectangular column-like or spherical, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

(Molded Article)

A molded article formed out of the resin composition of the present invention can be generally obtained by injection molding a pellet of the resin composition. For injection molding, not only ordinary molding techniques but also injection molding techniques such as injection compression molding, injection press molding, gas assist injection molding, foam molding (including what comprises the injection of a supercritical fluid), insert molding, in-mold coating molding, insulated runner molding, quick heating and cooling molding, two-color molding, sandwich molding and super high-speed injection molding may be employed. The cold runner system and the hot runner system may be selected for molding.

According to the present invention, the resin composition can be extrusion molded to obtain an atypical extrusion molded article, sheet or film. For the molding of a sheet or a film, inflation, calendering or casting may be used. Further, the resin composition may be molded into a heat shrinkable tube by carrying out specific stretching operation. The resin composition of the present invention can be formed into a molded article by rotational molding or blow molding.

(Surface Treatment)

Various surface treatments may be further carried out on a molded article of the present invention. The surface treatments include hard coating, water-repelling and oil-repelling coating, hydrophilic coating, antistatic coating, UV absorption coating, infrared absorption coating and metallizing (such as deposition). Examples of the surface treatment method include vapor deposition, flame spray coating and plating, besides solvent coating. The vapor deposition may be either physical vapor deposition or chemical vapor deposition. Examples of the physical vapor deposition include vacuum deposition, sputtering and ion plating. Examples of the chemical vapor deposition (CVD) include thermal CVD, plasma CVD and optical CVD.

EXAMPLES

The following examples are provided for the purpose of further illustrating the present invention but are in no way to be taken as limiting. The examples were evaluated by the following methods.

(1) Dynamic Friction Coefficient

The AFT-15M reciprocating dynamic frictional wear tester of Orientec Co., Ltd. was used as an evaluating apparatus. A pin-like test specimen (material: steel) having a spherical surface at the end of an assembly consisting of a hemisphere having a diameter of 5 mm and a column having a diameter of 5 mm and a length of 30 mm both of which were bonded together on the circular sections was mounted on a fixing side test specimen holder. Meanwhile, a plate-like test specimen (gate was a fin gate having a width of 40 mm and a thickness of 1 mm from one end of the side) having a length of 150 mm, a width of 150 mm and a thickness of 2 mm was manufactured by injection molding the resin composition of each Example or each Comparative Example, the center portion of the test specimen was cut out to a length of 50 mm and a width of 100 mm, and the cut-out test specimen was fixed on a reciprocating pedestal. The spherical portion at the end of the above pin-like test specimen was brought into contact with the flat portion of the cut-out test specimen of the plate-like test specimen under a load of 9.8 N while the direction of the columnar axis of the pin-like test specimen became parallel to the normal direction of the flat surface of the plate-like test specimen. In this contact state, the test specimens were reciprocated a one-way distance of 25 mm 1,000 times over one straight line within the plane at a rate of 2 seconds per one round trip in a 23° C. and 50% RH atmosphere, friction force after 1,000 times of reciprocation was measured with a load cell having a capacity of 49 N connected to the pin-like test specimen, and the dynamic friction coefficient was calculated from the relationship with the above load.

(2) Critical PV Value

A cylindrical test specimen having an outer diameter of 25 mm and an inner diameter of 20 mm was molded and a thrust frictional wear test was carried out by using a wear tester [the Frictron frictional wear tester of Orientec Co., Ltd.] (the cylindrical test specimen was brought into contact with the end face of a material under a certain load and rotated). Carbon steel for mechanical structures (S-45C) was used as the material to carry out the test without lubricating it, and the critical PV value of the test specimen was measured by changing the applied load from 0 to 500 kg stepwise every 3 minutes at a slipping velocity of 20 cm/sec (revolution of 167 rpm). The term "critical PV value" as used herein means a value obtained by multiplying a critical applied load (P) at which the sliding surface of the material is deformed (molten) and destroyed by frictional heat by the slipping velocity (V).

(3) Impact Resistance

The notched Charpy impact strength was measured in accordance with ISO 179.

(4) Heat Resistance

The deflection temperature under load was measured in accordance with ISO 75-1 and 75-2. The measurement load was 1.80 MPa.

(5) Flame Retardancy

A 1.5 mm-thick test specimen was prepared in accordance with UL standards, and a UL94 vertical combustion test was made on this test specimen.

(6) Surface Appearance

A square board having a width of 50 mm, a length of 80 mm and a thickness of 2 mm was measured with the eyes. ◯ means that the surface appearance of the board was good and X means that the surface of the molded article had glaze nonuniformity due to phase separation, or the acryl-modified polyorganosiloxane component peeled off from the surface of the molded article at the time of injection molding.

The used raw materials shown in Table 1 are given below.

(Component A)

PC-1: aromatic polycarbonate resin (L-1225WP of Teijin Chemicals Ltd., viscosity average molecular weight of 22,400)

PC-2: aromatic polycarbonate resin (L-1225WX of Teijin Chemicals Ltd., viscosity average molecular weight of 19,700)

(Component B)

R-170: acryl-modified polyorganosiloxane [Sharine R-170 of Nisshin Kagaku Kogyo Co., Ltd., polydimethylsiloxane content of 70 wt %]

(Components Other than Component B)
PTFE: polytetrafluoroethylene resin [Rublon L-5 of Daikin Industries, Ltd., average particle diameter of about 7 μm]
(Component C)
F-114P: potassium perfluorobutanesulfonate [Megafac F-114P of Dainippon Ink and Chemicals, Inc.]
(Component D)
PX-200: phosphate essentially composed of resorcinol bis[di(2,6-dimethylphenyl)phosphate: [PX-200 of Daihachi Chemical Industry Co., Ltd.]
(Component E)
FA500: polytetrafluoroethylene having fibril forming capability [Polyfuron MP FA500 of Daikin Industries, Ltd.]
(Others)
IRX: phosphite compound (Irgafos168 of Ciba Specialty Chemicals K. K.)

Examples 1 to 17 and Comparative Examples 1 to 12

Resin compositions in Tables 1 to 3 were prepared as follows. Components in a ratio shown in Tables 1 to 3 were weighed and uniformly mixed together by using a tumbler, and the resulting mixtures were each injected into an extruder to prepare the resin compositions. A vented double-screw extruder having a diameter of 30 mm (KTX-30 of Kobe Steel, Ltd.) was used as the extruder. A strand was extruded at a cylinder temperature and a dice temperature of 280° C. and a vent suction degree of 3,000 Pa, cooled in a water bath and cut with a pelletizer to obtain a pellet. The obtained pellet was dried at 120° C. for 6 hours with a hot air circulating drier and molded into a test specimen at a cylinder temperature of 280° C. and a mold temperature of 70° C. by using an injection molding machine [IS150EN-5Y of Toshiba Machine Co., Ltd.], and the test specimen was evaluated by the above methods.

TABLE 1

| | | | | Example | | | | |
|---|---|---|---|---|---|---|---|---|
| | | | Unit | 1 | 2 | 3 | 4 | 5 |
| Composition | Component A | PC-1 | pbw | 100 | 100 | 100 | | 100 |
| | | PC-2 | pbw | | | | 100 | |
| | Component B | R-170 | pbw | 3.8 | 4.8 | 5.7 | 4.8 | 4.8 |
| | Component other than component B | PTFE | pbw | | | | | |
| | Others | IRX | pbw | | | | | 0.03 |
| Characteristic properties | Dynamic friction coefficient | — | | 0.32 | 0.20 | 0.18 | 0.19 | 0.19 |
| | Critical PV value | | kgf/cm·s | >5000 | >5000 | >5000 | >5000 | >5000 |
| | Impact resistance | | MPa | 63 | 62 | 60 | 58 | 60 |
| | Surface appearance | | — | ○ | ○ | ○ | ○ | ○ |

| | | | | Comparative Example | | | | | |
|---|---|---|---|---|---|---|---|---|---|
| | | | | 1 | 2 | 3 | 4 | 5 | 6 |
| Composition | Component A | PC-1 | | 100 | 100 | 100 | 100 | 100 | 100 |
| | | PC-2 | | | | | | | |
| | Component B | R-170 | | | 2.0 | 7.4 | | | |
| | Component other than component B | PTFE | | | | | 4.8 | 9.1 | 16.7 |
| | Others | IRX | | | | | | | |
| Characteristic properties | Dynamic friction coefficient | | | 0.80 | 0.53 | 0.18 | 0.32 | 0.23 | 0.20 |
| | Critical PV value | | | 250 | 800 | >5000 | 1440 | 1800 | 2500 |
| | Impact resistance | | | 68 | 63 | 58 | 30 | 25 | 18 |
| | Surface appearance | | | ○ | ○ | X | ○ | ○ | ○ | pbw: parts by weight

TABLE 2

| | | | | Example | | | | |
|---|---|---|---|---|---|---|---|---|
| | | | Unit | 6 | 7 | 8 | 9 | 10 |
| Composition | Component A | PC-1 | pbw | 100 | 100 | 100 | | |
| | | PC-2 | pbw | | | | 100 | 100 |
| | Component B | R-170 | pbw | 3.8 | 4.8 | 4.8 | 4.8 | 4.8 |
| | Component other than component B | PTFE | pbw | | | | | |
| | Component C | F-114P | pbw | 0.05 | 0.05 | 0.10 | 0.05 | 0.10 |
| | Others | IRX | pbw | | | | | |

TABLE 2-continued

| Characteristic properties | Dynamic friction coefficient | — | 0.32 | 0.20 | 0.19 | 0.20 | 0.21 |
|---|---|---|---|---|---|---|---|
| | Critical PV value | kgf/cm·s | >5000 | >5000 | >5000 | >5000 | >5000 |
| | Impact resistance | MPa | 60 | 59 | 56 | 55 | 52 |
| | Surface appearance | — | ○ | ○ | ○ | ○ | ○ |
| | Flame retardancy (1.5 mm) | UL94 | V-2 | V-2 | V-2 | V-2 | V-2 |

| | | | Example | | Comparative Example | | | |
|---|---|---|---|---|---|---|---|---|
| | | | 11 | 12 | 7 | 8 | 9 | 10 |
| Composition | Component A | PC-1 | 100 | 100 | 100 | 100 | 100 | 100 |
| | | PC-2 | | | | | | |
| | Component B | R-170 | 5.7 | 4.8 | 2.0 | 7.4 | | |
| | Component other than component B | PTFE | | | | | 9.1 | 16.7 |
| | Component C | F-114P | 0.05 | 0.05 | 0.05 | 0.05 | 0.05 | 0.05 |
| | Others | IRX | | 0.3 | | | | |
| Characteristic properties | Dynamic friction coefficient | | 0.18 | 0.18 | 0.53 | 0.32 | 0.23 | 0.20 |
| | Critical PV value | | >5000 | >5000 | 800 | >5000 | 1800 | 2500 |
| | Impact resistance | | 57 | 57 | 60 | 62 | 25 | 18 |
| | Surface appearance | | ○ | ○ | ○ | X | ○ | ○ |
| | Flame retardancy (1.5 mm) | | V-2 | V-2 | V-2 | Not-V | Not-V | Not-V | pbw: parts by weight

TABLE 3

| | | | | Example | | | | | Comparative Example | |
|---|---|---|---|---|---|---|---|---|---|---|
| | | | Unit | 13 | 14 | 15 | 16 | 17 | 11 | 12 |
| Composition | Component A | PC-1 | pbw | 100 | 100 | 100 | | 100 | 100 | 100 |
| | | PC-2 | pbw | | | | 100 | | | |
| | Component B | R-170 | pbw | 3.8 | 4.8 | 5.7 | 4.8 | 4.8 | 2.0 | 7.4 |
| | Component other than component B | PTFE | pbw | | | | | | | |
| | Component D | PX200 | pbw | 5.7 | 5.7 | 5.7 | 5.7 | 5.7 | 5.7 | 5.7 |
| | Component E | FA500 | pbw | 0.3 | 0.3 | 0.3 | 0.3 | 0.3 | 0.3 | 0.3 |
| | Others | IRX | pbw | | | | | 0.03 | | |
| Characteristic properties | Dynamic friction coefficient | | — | 0.32 | 0.20 | 0.19 | 0.19 | 0.19 | 0.53 | 0.19 |
| | Critical PV value | | kgf/cm·s | >5000 | >5000 | >5000 | >5000 | >5000 | 800 | >5000 |
| | Impact resistance | | MPa | 59 | 58 | 57 | 54 | 58 | 61 | 55 |
| | Heat resistance | | — | 110 | 110 | 110 | 110 | 110 | 110 | 110 |
| | Surface appearance | | — | ○ | ○ | ○ | ○ | ○ | ○ | X |
| | Flame retardancy (1.5 mm) | | UL94 | V-0 | V-0 | V-0 | V-0 | V-0 | V-0 | V-1 |

It is understood from comparison between Examples and Comparative Examples in Tables 1 to 3 that the resin composition of the present invention is excellent in slidability, impact resistance, heat resistance, flame retardancy and surface appearance.

EFFECT OF THE INVENTION

The resin composition of the present invention has excellent slidability and surface appearance without using a fluorine-based sliding agent. The resin composition of the present invention retains impact strength, heat resistance, flame retardancy and dimensional stability which are the inherent characteristic properties of a polycarbonate resin.

INDUSTRIAL FEASIBILITY

A molded article of the resin composition of the present invention is useful as an interior electromechanical part for use in electric and electronic appliances and OA equipment which are strongly required to be ecologically friendly.

The invention claimed is:
1. A resin composition consisting of 3.2 to 6.8 parts by weight of an acryl-modified polyorganosiloxane (component B) based on 100 parts by weight of an aromatic polycarbonate resin (component A),
    wherein the acryl-modified polyorganosiloxane (component B) is obtained by graft copolymerizing a polyorganosiloxane (component B1) represented by the following formula (1) with a mixture (component B2) of 70 to

100 wt % of a (meth)acrylic ester (component B2-1) and 0 to 30 wt % of another copolymerizable monomer (component B2-2) in a (component B2/component B1) weight ratio of 5/95 to 95/5:

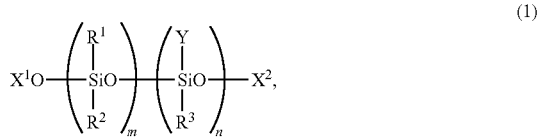

(1)

and
wherein in the above formula, $R^1$, $R^2$ and $R^3$ are each independently a hydrocarbon group having 1 to 20 carbon atoms or a halogenated hydrocarbon group having 1 to 20 carbon atoms, Y is a radical reactive group selected from the group consisting of a vinyl group, an allyl group and a γ-(meth)acryloxypropyl group, $X^1$ and $X^2$ are each independently a hydrogen atom, an alkyl group having 1 to 4 carbon atoms or a group represented by —$SiR^4R^5R^6$ ($R^4$ and $R^5$ are each independently a hydrocarbon group having 1 to 20 carbon atoms or a halogenated hydrocarbon group having 1 to 20 carbon atoms, and $R^6$ is a hydrocarbon group having 1 to 20 carbon atoms, a halogenated hydrocarbon group having 1 to 20 carbon atoms or a radical reactive group selected from the group consisting of a vinyl group, an allyl group and a γ-(meth)acryloxypropyl group), m is a positive integer of 10,000 or less, and n is an integer of 1 to 500.

2. The resin composition according to claim 1, wherein the component B2-1 is methyl methacrylate and/or 2-hydroxyethyl methacrylate.

3. The resin composition according to claim 1, wherein the weight ratio of the component B2 to the component B1 is 20/80 to 60/40.

4. A resin composition consisting of 3.2 to 6.8 parts by weight of an acryl-modified polyorganosiloxane (component B) based on 100 parts by weight of an aromatic polycarbonate resin (component A) and 0.005 to 0.6 part by weight of an organic metal salt-based flame retardant (component C) based on 100 parts by weight of the aromatic polycarbonate resin (component A),
wherein the acryl-modified polyorganosiloxane (component B) is obtained by graft copolymerizing a polyorganosiloxane (component B1) represented by the following formula (1) with a mixture (component B2) of 70 to 100 wt % of a (meth)acrylic ester (component B2-1) and 0 to 30 wt % of another copolymerizable monomer (component B2-2) in a (component B2/component B1) weight ratio of 5/95 to 95/5:

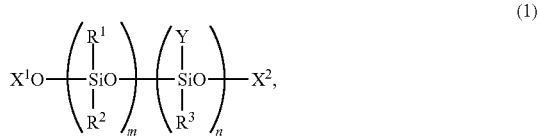

(1)

and
wherein in the above formula, $R^1$, $R^2$ and $R^3$ are each independently a hydrocarbon group having 1 to 20 carbon atoms or a halogenated hydrocarbon group having 1 to 20 carbon atoms, Y is a radical reactive group selected from the group consisting of a vinyl group, an allyl group and a γ-(meth)acryloxypropyl group. $X^1$ and $X^2$ are each independently a hydrogen atom, an alkyl group having 1 to 4 carbon atoms or a group represented by —$SiR^4R^5R^6$ ($R^4$ and $R^5$ are each independently a hydrocarbon group having 1 to 20 carbon atoms or a halogenated hydrocarbon group having 1 to 20 carbon atoms, and $R^6$ is a hydrocarbon group having 1 to 20 carbon atoms, a halogenated hydrocarbon group having 1 to 20 carbon atoms or a radical reactive group selected from the group consisting of a vinyl group, an allyl group and a γ-(meth)acryloxypropyl group), m is a positive integer of 10,000 or less, and n is an integer of 1 to 500.

5. The resin composition according to claim 4, wherein the organic metal salt-based flame retardant (component C) is an alkali (earth) metal salt of an organic acid.

6. The resin composition according to claim 5, wherein the alkali (earth) metal salt of an organic acid (component C) is an alkali (earth) metal salt of an organic sulfonic acid.

7. A resin composition consisting of 3.2 to 6.8 parts by weight of an acryl-modified polyorganosiloxane (component B) based on 100 parts by weight of an aromatic polycarbonate resin (component A) and 4.0 to 9.0 parts by weight of an organic phosphorus compound-based flame retardant (component D) based on 100 parts by weight of the aromatic polycarbonate resin (component A),
wherein the acryl-modified polyorganosiloxane (component B) is obtained by graft copolymerizing a polyorganosiloxane (component B1) represented by the following formula (1) with a mixture (component B2) of 70 to 100 wt % of a (meth)acrylic ester (component B2-1) and 0 to 30 wt % of another copolymerizable monomer (component B2-2) in a (component B2/component B1) weight ratio of 5/95 to 95/5:

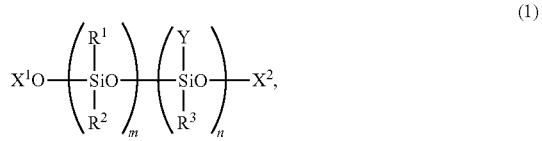

(1)

and
wherein in the above formula, $R^1$, $R^2$ and $R^3$ are each independently a hydrocarbon group having 1 to 20 carbon atoms or a halogenated hydrocarbon group having 1 to 20 carbon atoms, Y is a radical reactive group selected from the group consisting of a vinyl group, an allyl group and a γ-(meth)acryloxypropyl group, $X^1$ and $X^2$ are each independently a hydrogen atom, an alkyl group having 1 to 4 carbon atoms or a group represented by —$SiR^4R^5R^6$ ($R^4$ and $R^5$ are each independently a hydrocarbon group having 1 to 20 carbon atoms or a halogenated hydrocarbon group having 1 to 20 carbon atoms, and $R^6$ is a hydrocarbon group having 1 to 20 carbon atoms, a halogenated hydrocarbon group having 1 to 20 carbon atoms or a radical reactive group selected from the group consisting of a vinyl group, an allyl group and a γ-(meth)acryloxypropyl group), m is a positive integer of 10,000 or less, and n is an integer of 1 to 500.

8. A resin composition consisting of 3.2 to 6.8 parts by weight of an acryl-modified polyorganosiloxane (component B) based on 100 parts by weight of an aromatic polycarbonate resin (component A) and 0.01 to 1 part by weight of a fluorine-containing dripping inhibitor (component E) based on 100 parts by weight of the aromatic polycarbonate resin (component A),
wherein the acryl-modified polyorganosiloxane (component B) is obtained by graft copolymerizing a polyorganosiloxane (component B1) represented by the following formula (1) with a mixture (component B2) of 70 to 100 wt % of a (meth)acrylic ester (component B2-1) and 0 to 30 wt % of another copolymerizable monomer (component B2-2) in a (component B2/component B1) weight ratio of 5/95 to 95/5:

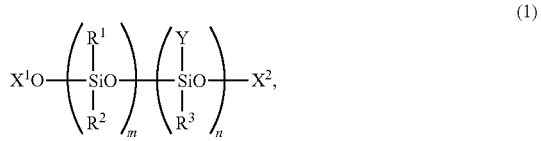

and
wherein in the above formula, $R^1$, $R^2$ and $R^3$ are each independently a hydrocarbon group having 1 to 20 carbon atoms or a halogenated hydrocarbon group having 1 to 20 carbon atoms, Y is a radical reactive group selected from the group consisting of a vinyl group, an allyl group and a γ-(meth)acryloxypropyl group, $X^1$ and $X^2$ are each independently a hydrogen atom, an alkyl group having 1 to 4 carbon atoms or a group represented by —$SiR^4R^5R^6$ ($R^4$ and $R^5$ are each independently a hydrocarbon group having 1 to 20 carbon atoms or a halogenated hydrocarbon group having 1 to 20 carbon atoms, and $R^6$ is a hydrocarbon group having 1 to 20 carbon atoms, a halogenated hydrocarbon group having 1 to 20 carbon atoms or a radical reactive group selected from the group consisting of a vinyl group, an allyl group and a γ-(meth)acryloxypropyl group), m is a positive integer of 10,000 or less, and n is an integer of 1 to 500.

9. A resin composition consisting of 3.2 to 6.8 parts by weight of an acryl-modified polyorganosiloxane (component B) based on 100 parts by weight of an aromatic polycarbonate resin (component A) and 4.0 to 9.0 parts by weight of an organic phosphorus compound-based flame retardant (component D) and 0.01 to 1 part by weight of a fluorine-containing dripping inhibitor (component E) based on 100 parts by weight of the aromatic polycarbonate resin (component A), wherein the acryl-modified polyorganosiloxane (component B) is obtained by graft copolymerizing a polyorganosiloxane (component B1) represented by the following formula (1) with a mixture (component B2) of 70 to 100 wt % of a (meth)acrylic ester (component B2-1) and 0 to 30 wt % of another copolymerizable monomer (component B2-2) in a (component B2/component B1) weight ratio of 5/95 to 95/5:

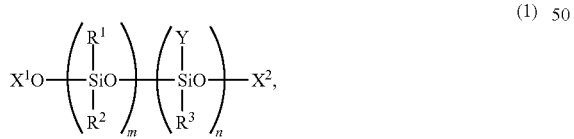

and
wherein in the above formula, $R^1$, $R^2$ and $R^3$ are each independently a hydrocarbon group having 1 to 20 carbon atoms or a halogenated hydrocarbon group having 1 to 20 carbon atoms, Y is a radical reactive group selected from the group consisting of a vinyl group, an allyl group and a γ-(meth)acryloxypropyl group, $X^1$ and $X^2$ are each independently a hydrogen atom, an alkyl group having 1 to 4 carbon atoms or a group represented by —$SiR^4R^5R^6$ ($R^4$ and $R^5$ are each independently a hydrocarbon group having 1 to 20 carbon atoms or a halogenated hydrocarbon group having 1 to 20 carbon atoms, and $R^6$ is a hydrocarbon group having 1 to 20 carbon atoms, a halogenated hydrocarbon group having 1 to 20 carbon atoms or a radical reactive group selected from the group consisting of a vinyl group, an allyl group and a γ-(meth)acryloxypropyl group), m is a positive integer of 10,000 or less, and n is an integer of 1 to 500.

10. The resin composition according to claim 7, wherein the organic phosphorus compound-based flame retardant (component D) is a phosphate represented by the following formula (2):

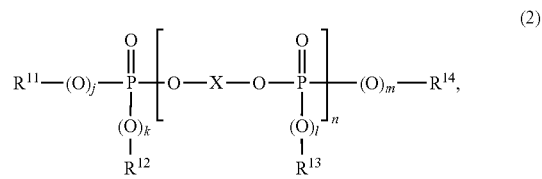

wherein in the above formula, X is a diphenol residue derived from a dihydroxy compound selected from the group consisting of hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl)sulfide, j, k, l and m are each independently 0 or 1, and n is an integer of 0 to 5 (n is an average value in the case of a mixture of phosphates having different degrees n of polymerization), and $R^{11}$, $R^{12}$, $R^{13}$ and $R^{14}$ are each independently a monophenol residue derived from an aryl group selected from the group consisting of phenol, cresol, xylenol, isopropylphenol, butylphenol and p-cumylphenol which may be substituted by a halogen atom.

11. A molded article comprising the resin composition of claim 1.

* * * * *